US012643462B2

(12) United States Patent
Berlitz et al.

(10) Patent No.: US 12,643,462 B2
(45) Date of Patent: Jun. 2, 2026

(54) MOTOR VEHICLE COMPRISING AT LEAST ONE ILLUMINATION DEVICE AND AT LEAST ONE ACOUSTIC DEVICE, AND METHOD FOR OPERATING A MOTOR VEHICLE

(71) Applicant: AUDI AG, Ingolstadt (DE)

(72) Inventors: Stephan Berlitz, Schrobenhausen (DE); Tanja Kammann, Munich (DE); Cesar Muntada Roura, Pffafenhofen an der Ilm (DE); Valentin Schmidt, Neuburg a.d. Donau (DE); Konrad Tröger, Kösching (DE)

(73) Assignee: AUDI AG, Ingolstadt (DE)

( * ) Notice: Subject to any disclaimer, the term of this patent is extended or adjusted under 35 U.S.C. 154(b) by 141 days.

(21) Appl. No.: 18/547,304

(22) PCT Filed: Feb. 24, 2022

(86) PCT No.: PCT/EP2022/054630
§ 371 (c)(1),
(2) Date: Aug. 21, 2023

(87) PCT Pub. No.: WO2022/180154
PCT Pub. Date: Sep. 1, 2022

(65) Prior Publication Data
US 2024/0131980 A1    Apr. 25, 2024
US 2024/0227661 A9    Jul. 11, 2024

(30) Foreign Application Priority Data
Feb. 25, 2021    (DE) ..................... 10 2021 104 465.0

(51) Int. Cl.
*B60Q 1/00*        (2006.01)
*B60Q 1/22*        (2006.01)
(Continued)

(52) U.S. Cl.
CPC ............. *B60Q 1/0023* (2013.01); *B60Q 1/22* (2013.01); *B60Q 5/005* (2013.01); *B60Q 3/225* (2017.02); *B60Q 2400/40* (2013.01)

(58) Field of Classification Search
None
See application file for complete search history.

(56) References Cited

U.S. PATENT DOCUMENTS 6,587,573 B1 *    7/2003    Stam ...................... B60Q 1/143
                                              382/104
7,439,849 B2    10/2008    Kameyama
(Continued)

FOREIGN PATENT DOCUMENTS

CN        110239425 A        9/2019
CN        211196033 U        8/2020
(Continued)

OTHER PUBLICATIONS

International Search Report and Written Opinion of the International Searching Authority directed to related International Patent Application No. PCT/EP2022/054630, mailed Jun. 10, 2022, with attached English-language translation; 23 pages.
(Continued)

*Primary Examiner* — Kenneth B Wells
(74) *Attorney, Agent, or Firm* — Sterne, Kessler, Goldstein & Fox P.L.L.C.

(57)        ABSTRACT

The present disclosure relates to a motor vehicle comprising at least one illumination device, by means of which at least one light signal can be generated which is visible from outside the motor vehicle, and comprising at least one acoustic device, by means of which at least one acoustic signal can be generated which is audible from outside the motor vehicle. The at least one control device of the motor
(Continued)

vehicle is configured to check whether at least one output condition is satisfied and, if the at least one output condition is satisfied, to control the at least one illumination device and the at least one acoustic device in such a way that the light signal and the acoustic signal are generated simultaneously. The at least one output condition is at least one get-in or get-out condition relating to a current start-up and/or turn-off situation of the motor vehicle, the satisfaction of which condition depends on at least one control and/or sensor signal which can be generated by means of a system and/or sensor of the motor vehicle relating to the start-up and/or turn-off process of the motor vehicle, and/or at least one maneuver condition relating to a current or imminent reversing or acceleration maneuver of the motor vehicle, the satisfaction of which condition depends on at least one control signal which can be generated by means of a driver assistance system of the motor vehicle and/or on at least one operating signal which can be generated by a user by means of at least one operating device of the motor vehicle, and/or at least one driving state condition relating to a current operating situation of the motor vehicle, the satisfaction of which condition depends on at least one control signal which can be generated by means of the or a driver assistance system of the motor vehicle.

20 Claims, 3 Drawing Sheets

(51) Int. Cl.
    *B60Q 5/00*       (2006.01)
    *B60Q 3/225*     (2017.01)

(56)           References Cited

U.S. PATENT DOCUMENTS

| | | | |
|---|---|---|---|
| 8,994,548 B2 | 3/2015 | Gaboury et al. | |
| 10,156,848 B1* | 12/2018 | Konrardy | B60R 25/255 |
| 10,720,029 B1* | 7/2020 | Mears | H04L 67/306 |
| 11,168,506 B2 | 11/2021 | Schulz et al. | |
| 2005/0099820 A1* | 5/2005 | Cooper | B60Q 1/326 |
| | | | 362/500 |
| 2007/0200669 A1 | 8/2007 | McBride et al. | |
| 2012/0235568 A1 | 9/2012 | Prodin et al. | |
| 2015/0329039 A1 | 11/2015 | Courcelles | |

| | | | |
|---|---|---|---|
| 2016/0023588 A1* | 1/2016 | Peterson | B60Q 1/34 |
| | | | 315/77 |
| 2017/0300760 A1* | 10/2017 | Ellerhold | H04L 63/10 |
| 2018/0079463 A1* | 3/2018 | Pearce | B62J 45/412 |
| 2018/0134285 A1* | 5/2018 | Cho | B60W 30/09 |
| 2018/0178652 A1* | 6/2018 | Monroe | B60K 35/60 |
| 2018/0354411 A1* | 12/2018 | Shmueli Friedland | B60Q 9/00 |
| 2019/0054856 A1* | 2/2019 | Salter | B60Q 3/60 |
| 2019/0268743 A1* | 8/2019 | Cho | B60Q 1/545 |
| 2019/0275985 A1* | 9/2019 | Turner | B60R 25/24 |
| 2020/0283021 A1* | 9/2020 | Horii | B60W 30/18109 |
| 2021/0061170 A1* | 3/2021 | Krishnaswamy | B60Q 5/005 |
| 2021/0394783 A1 | 12/2021 | Meier-Arendt et al. | |
| 2023/0252879 A1* | 8/2023 | Rossey | G08B 21/22 |
| | | | 340/686.6 |
| 2023/0385017 A1* | 11/2023 | Soto | G06F 3/165 |
| 2024/0075870 A1* | 3/2024 | Prey | B60Q 1/324 |

FOREIGN PATENT DOCUMENTS

| | | |
|---|---|---|
| DE | 102005041261 | 3/2006 |
| DE | 102005035040 A1 | 4/2006 |
| DE | 102005021655 A1 | 9/2006 |
| DE | 102009037170 A1 | 2/2011 |
| DE | 102011119463 A1 | 5/2012 |
| DE | 102010019829 B4 | 1/2014 |
| DE | 102014007171 A1 | 11/2014 |
| DE | 102014210546 A1 | 12/2014 |
| DE | 102014226254 A1 | 6/2016 |
| DE | 102016008338 A1 | 2/2017 |
| DE | 102015118331 A1 | 3/2017 |
| DE | 102016206347 A1 | 10/2017 |
| DE | 102018004122 A1 | 11/2018 |
| DE | 102017215931 A1 | 3/2019 |
| DE | 102019002268 A1 | 9/2019 |
| DE | 102018216130 A1 | 3/2020 |
| DE | 102019206782 A1 | 9/2020 |
| EP | 0454934 A1 | 11/1991 |
| GB | 2499109 A | 8/2013 |
| GB | 2583184 A | 10/2020 |
| JP | 2018165088 A | 10/2018 |
| WO | WO 2019/219028 | 11/2019 |

OTHER PUBLICATIONS

International Preliminary Report on Patentability directed to related International Patent Application No. PCT/EP2022/054630, mailed Jun. 1, 2023, with attached English-language translation; 28 pages.
Chinese Application No. 202280015124.X, Office Action mailed Feb. 11, 2026; 9 pages.

* cited by examiner

MOTOR VEHICLE COMPRISING AT LEAST ONE ILLUMINATION DEVICE AND AT LEAST ONE ACOUSTIC DEVICE, AND METHOD FOR OPERATING A MOTOR VEHICLE

TECHNICAL FIELD

The present disclosure relates to a motor vehicle comprising at least one illumination device by means of which at least one light signal visible from outside the motor vehicle can be generated, and comprising at least one acoustic device by means of which at least one acoustic signal audible from outside the motor vehicle can be generated. In addition, the present disclosure relates to a method for operating a motor vehicle.

BACKGROUND

Illumination devices in motor vehicles are known from the prior art. Thus, illumination devices such as headlights are typically used to illuminate an environment of the motor vehicle for better visibility of the driver. An information output to further road users through the illumination devices is also possible—for example, by means of a turn signal, a light flash, or a reversing light. Moreover, acoustic devices of motor vehicles, such as a horn, are also known from the prior art and serve primarily to alert other road users to possible hazardous situations.

From the prior art—in particular, from US 2015/0329039 A1 or GB 2583184 A—it is known to combine, and in particular synchronize, a flashing signal indicating a change in direction of a motor vehicle with a sound signal. The output takes place, for example, as a function of detected pedestrians or cyclists, the current speed of the motor vehicle, or the current time.

BRIEF DESCRIPTION OF DRAWINGS/FIGURES

Further advantages and details of the present disclosure are explained with reference to the figures explained below and the exemplary embodiments. Shown here, schematically, are:

DETAILED DESCRIPTION

Figure 1:
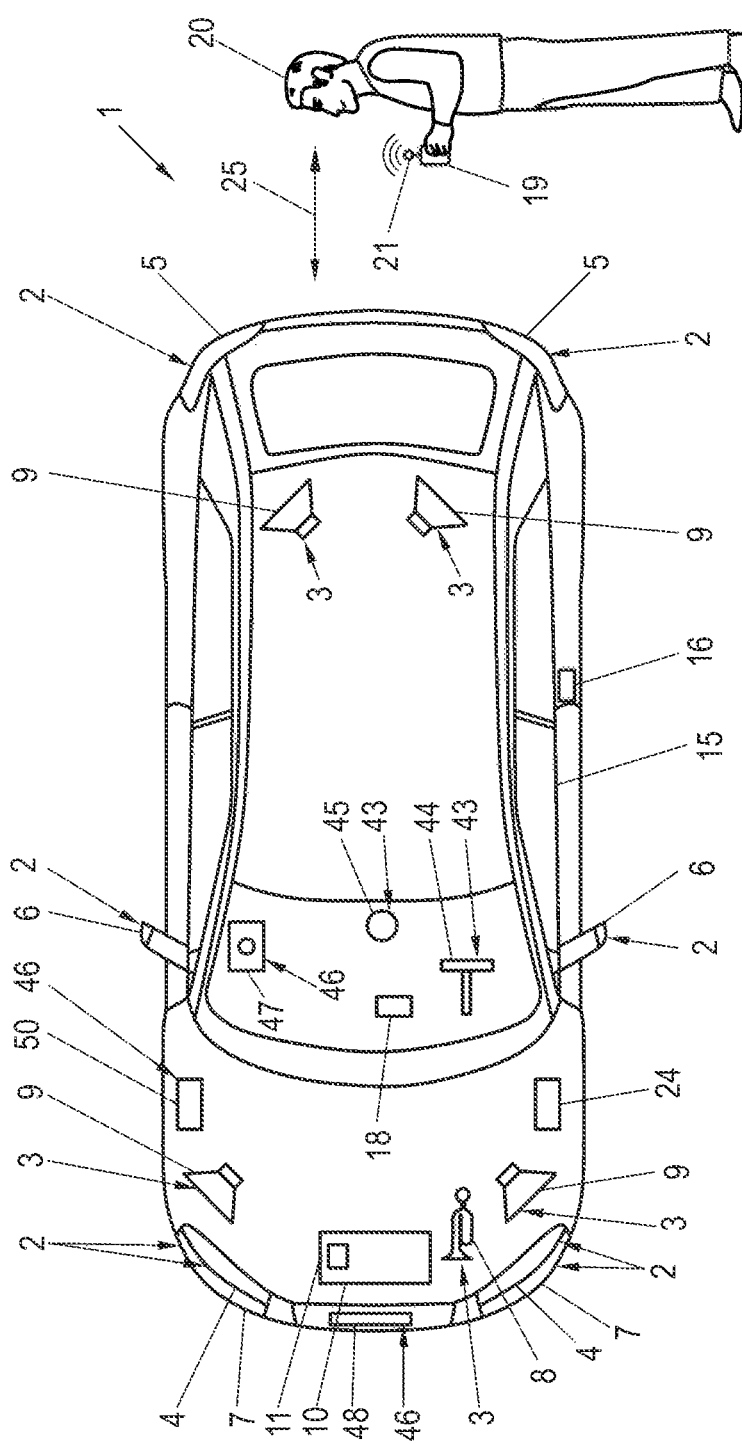
FIG. 1 shows a plan view of an exemplary embodiment of the motor vehicle according to the present disclosure.

The object of the present disclosure is to enable improved operation of the illumination device and of the acoustic device of the motor vehicle—in particular, with regard to an information output that is as efficient and reliable as possible.

In the motor vehicle of the type mentioned at the outset, the object is achieved according to the present disclosure in that at least one control device of the motor vehicle is designed to check whether at least one output condition is satisfied and, if the at least one output condition is satisfied, to control the at least one illumination device and the at least one acoustic device in such a way that the light signal and the acoustic signal are generated simultaneously, wherein the at least one output condition is at least one get-in or get-out condition relating to a current start-up and/or turn-off situation of the motor vehicle, the satisfaction of which condition depends upon at least one control and/or sensor signal which can be generated by means of a system and/or sensor of the motor vehicle relating to the start-up and/or turn-off process of the motor vehicle, and/or at least one maneuver condition relating to a current or imminent reversing or acceleration maneuver of the motor vehicle, the satisfaction of which condition depends upon at least one control signal which can be generated by means of a driver assistance system of the motor vehicle and/or upon at least one operating signal which can be generated by a user by means of at least one operating device of the motor vehicle, and/or at least one driving state condition relating to a current operating situation of the motor vehicle, the satisfaction of which condition depends upon at least one control signal which can be generated by means of a driver assistance system of the motor vehicle.

The present disclosure is based upon the idea that the signals output by means of the at least one illumination device and the signals output by means of the at least one acoustic device are output together so that they are reliably and intuitively perceivable by further road users and/or the driver of the motor vehicle. Thus, the light signal is supported by the sound signal, and vice versa. In particular, it is conceivable that a person who is currently not looking in the direction of the motor vehicle or who suffers from a visual impairment still detects the information to be conveyed by means of the signal output on the basis of the acoustic signal. Furthermore, it is conceivable that the acoustic signal is difficult to perceive due to a currently loud noise background, e.g., due to urban traffic or motorway traffic, or due to a hearing of a person, wherein the information to be conveyed by means of the signal output is nevertheless perceived by means of the light signal. In addition, it is conceivable that the illumination device or the acoustic device, e.g., in an accident situation, is defective and therefore the signal output is no longer possible, wherein the information can then be provided at least by means of the other, still intact, device. If several illumination devices and/or several acoustic devices are provided, an individual control of these devices is also conceivable by means of the control device.

The simultaneous or synchronous generation of the light signal and the acoustic signal means that the output of these signals is output in a manner coordinated with one another in terms of time. In particular, it can be provided that the output time periods of the light signal and of the acoustic signal be identical, overlap, or follow one another directly—optionally, with the insertion of a pause.

The aspect that, when the at least one output condition is satisfied, the at least one illumination device and the at least one acoustic device are activated means that certain sensor and/or control signals are evaluated by the control device. The output condition is satisfied, in particular, in the presence of correspondingly predetermined sensor and/or control signals and/or when corresponding sensor parameters are at predetermined intervals. Thus, the satisfaction of the output condition implies a situation in which the output of the light signal and the acoustic signal is indicated. Specific examples of these conditions will be explained in detail later.

In the present disclosure, the simultaneous output of the light signal and of the acoustic signal is performed on the basis of the satisfaction of the at least one output condition, which can be the get-on or get-out condition, the maneuver condition, and/or the driving state condition, wherein these three aspects will be explained in greater detail below.

If the at least one output condition is the at least one get-in or get-out condition, further road users can be made aware that the driver can be located in the region of the motor vehicle and/or that the motor vehicle is about to drive off, and, consequently, increased caution is required. The user, who is in particular the driver of the motor vehicle, can be provided with information advising that a locking or unlocking operation of the motor vehicle and/or a start-up or turn-off of the motor vehicle has been successfully carried out, and/or that there can be an error in the motor vehicle and/or the like.

If the at least one output condition is the maneuver condition, further road users are informed of the pending reversing or acceleration maneuver and can adapt to it. For example, pedestrians who are about to cross a road, resulting in the initiation of the signal output that is implied by the imminent acceleration maneuver, can wait until the motor vehicle has passed. With regard to the reversing maneuver, further road users are made aware of the fact that they must be cautious—in particular, since the driver's view is frequently limited in this case, which can represent an increased hazard potential—in particular, for children.

If the at least one output condition is the driving state condition describing the current operating situation of the motor vehicle, then the information output is advantageously carried out without further intervention by the driver, who, for example, might not yet have recognized a corresponding hazard situation which the signal is intended to indicate. Ultimately, this also results in an increase in comfort for the driver.

The at least one illumination device can be at least one headlight, by means of which an—in particular, white—daytime running light and/or a low beam and/or a high beam and/or an—in particular, orange—flashing light for direction indication can be generated. In this case, the headlight is therefore used in a synergistic manner not only, for example, for the illumination of the surroundings of the motor vehicle, but also for the output of the light signal in the motor vehicle according to the present disclosure. In particular, two headlights can be provided, which are arranged on the front, and, moreover, on the left and right sides, of the motor vehicle.

The at least one headlight can additionally or alternatively be a projection unit by means of which a projection onto a projection surface in the surroundings of the motor vehicle can be generated. In particular, the at least one headlight can be a so-called Digital Matrix Light ("DML") in which several light-emitting diodes arranged in a matrix-like manner within a surface are typically provided. The light generated by the light-emitting diodes can be influenced or deflected by an optical influencing unit of the projection unit, which comprises mirrors and/or lenses, for generating the projection. For example, a road or a wall or a wall in the surroundings of the motor vehicle can be used as the projection surface. By means of the projection unit, a warning symbol or a written text or the like can be output as, optionally, a multi-colored light signal. In this context, it is clear that, in the present disclosure, the light signal need not be only the illumination of a light source of the illumination device itself that can be recognized by direct line of sight, but can also be a projection shown in the surroundings of the motor vehicle.

The at least one illumination device can be at least one rear light. A tail light and/or a flashing light for direction indication can be generated by means of the at least one rear light. In particular, two rear lights can be provided, which are arranged on the rear, and, moreover, on the left and right sides, of the motor vehicle.

It is also conceivable that the at least one illumination device be at least one side light, by means of which, in particular, a flashing light for direction indication can be generated. The side light can, for example, be a turn signal arranged on a rear-view mirror of the motor vehicle. Preferably, at least one side light is provided on the left and right sides of the motor vehicle.

Lastly, the at least one illumination device can be at least one position light by means of which a position light of the motor vehicle can be generated. Thus, two position lights can be provided, each of which is arranged in particular adjacent to and below the two headlights. A white position light of the motor vehicle can be output by means of the position lights.

The acoustic device of the motor vehicle can be a horn, for example. Thus, a corresponding horn noise alerts the further road users directly and intuitively of a potential hazard situation. Additionally or alternatively, the at least one acoustic device can be a loudspeaker of the motor vehicle. In this case, the acoustic signal can be not only a single, fixedly predetermined signal, such as a horn noise or the like, but, instead, in this context, a spoken text or any noise such as a humming or a beeping sound is conceivable in this context and can be output by means of the loudspeaker.

In the motor vehicle according to the present disclosure, it can be provided that the at least one control device be configured to control the at least one illumination device and the at least one acoustic device as a function of brightness information and/or ambient volume information detectable by means of at least one sensor of the motor vehicle. The output of the signals can be output to be optimized in a situation-specific manner, and specifically as a function of the current ambient brightness and/or ambient noise.

The sensor can be a light sensor—in particular, a camera—by means of which the ambient brightness of the motor vehicle can be detected. It can thus be provided—in particular, if the brightness information implies that the motor vehicle is currently in a tunnel, for example, or it is night—the light signal be output to be correspondingly darker. In general terms, the light signal can be all the brighter, the brighter the ambient brightness is. This avoids any blinding of further road users, wherein a correspondingly darker light signal is readily discernible in the case of reduced brightness. Conversely, a rather high ambient brightness means, e.g., due to corresponding weather conditions, that the light signal should be brighter to ensure sufficient visibility. In addition, in the case where the brightness information implies that the light signal is currently not recognizable due to a high ambient brightness, it can be provided that the volume of the acoustic signal be increased.

The sensor can be a sound sensor—in particular, a microphone—by means of which the volume of the ambient noise of the motor vehicle can be detected. Thus, the acoustic signal and/or the light signal can be all the brighter, the louder it currently is in the surroundings of the motor vehicle. Thus, it is conceivable, for example, that the acoustic signal is barely audible anymore due to high road noise in urban or motorway traffic, wherein this is compensated for by a corresponding volume increase of the acoustic signal. In addition, in this case, the brightness of the light signal can also be increased, so that a reduced signal effect of the acoustic signal due to the ambient volume is likewise compensated for.

In conjunction with the motor vehicle according to the present disclosure, it can be provided that this comprise at least one interior illumination device, by means of which an illumination light illuminating the passenger compartment of the motor vehicle can be generated, wherein the at least one control device of the motor vehicle is designed to additionally control the at least one interior illumination device, if the at least one output condition is satisfied, in such a way that the light signal, the acoustic signal, and the illumination light are generated simultaneously. The at least one interior illumination device can comprise at least one ceiling light arranged in the region of a vehicle headliner of the motor vehicle. Since the illumination light is typically also visible from outside the motor vehicle, the inclusion of the interior illumination device amplifies the advantages of the present disclosure set out above.

Further optional details relating to the at least one output condition are explained below. If the at least one output condition is the at least one get-in or get-out condition, it can be provided that this be a door condition which relates to whether a door of the motor vehicle is currently open or closed, wherein the satisfaction of the door condition depends upon a sensor signal that can be generated by means of a door state sensor of the motor vehicle. The get-in or get-out condition is satisfied, for example, when the signals of the door state sensor indicate an opening or closing of the door. The door state sensor can be a binary sensor indicating whether the door is currently in an open or closed state.

The at least one get-in or get-out condition can be an ignition lock condition which relates to a current change in a key position of an ignition lock of the motor vehicle, wherein the satisfaction of the ignition lock condition depends upon a sensor signal that can be generated by means of an ignition lock sensor of the motor vehicle. Thus, for example, a switch-off of the ignition indicates that the driver is about to get out of the motor vehicle. A switch-on of the ignition implies that the motor vehicle is expected to be driven off shortly. The ignition lock sensor can be a binary sensor, the detected information of which indicates the current key position in the ignition lock of the motor vehicle.

The at least one get-in or get-out condition can be a locking condition which relates to the presence of a locking or unlocking signal effecting a locking or unlocking of the motor vehicle, wherein the locking or unlocking signal can be generated by means of the control device or a control unit of a locking system of the motor vehicle. Thus, the locking condition is satisfied if the locking or unlocking signal is present, since, in this situation, it can be assumed that the motor vehicle has been parked or stopped, or that the motor vehicle is expected to be driven off shortly.

If the get-in or get-out condition is the locking condition, it can be provided that a key of the motor vehicle have a radio transmitter, by means of which a radio signal detectable by a radio sensor of the motor vehicle can be generated, wherein the locking or unlocking signal can be generated as a function of the radio signal. In this embodiment, the locking or unlocking signal is therefore generated not only in the case of a physical locking or unlocking of the motor vehicle, i.e., when inserting and rotating the key in a door lock of the motor vehicle, but, rather, is generated as a function of the radio signal.

In a development thereof, it is preferably provided that the at least one control device or the control unit of the locking system be configured to determine, on the basis of the radio signal, key position information relating to a current distance between the motor vehicle and the key and/or a current direction of the key with respect to the motor vehicle, wherein the control device is configured to control the at least one illumination device and the at least one acoustic device as a function of the key position information. For example, the control device can determine the current distance between the key or the driver and the motor vehicle on the basis of the signal strength of the radio signal detected by means of the radio sensor. In this embodiment, the light signal and/or the acoustic signal serve as information carriers regarding the current distance of the driver from the motor vehicle. Furthermore, the control device can be configured to determine the direction of the key with respect to the motor vehicle as a function of the radio signal detected by the radio sensor. For this purpose, it is conceivable for the motor vehicle to have several radio sensors, wherein the differences in the signal strengths of the radio signal detected by the radio sensors are used to determine the direction of the key.

In this case, the control device can be configured to control the at least one illumination device and the at least one acoustic device as a function of the key position information, such that a current flashing frequency of the light signal and/or a current frequency of the periodically switched-on acoustic signal and/or a current sound frequency and/or a current volume of the acoustic signal depends upon the key position information. For example, the acoustic signal can increase with respect to the audio frequency and decrease with respect to the volume if the key or the driver come increasingly closer to the motor vehicle.

In addition, it can be provided with respect to the detected direction that the light signal and/or the acoustic signal be output in a targeted manner in the direction of the user. Thus, for example, only those illumination devices can output a light signal that are visible to the user due to the viewing angle of the user to the motor vehicle. In addition, for example, only those acoustic devices, the output direction of which faces the user, can output the acoustic signal.

The key can have at least one operating device—in particular, a locking button and an unlocking button—wherein an actuation of the at least one operating device causes the generation of the radio signal, wherein the locking condition is satisfied when the radio signal is detected by the radio sensor. Pressing the locking or unlocking button causes the generation of a specific radio signal by the radio transmitter which, when the control unit of the locking system is detected by the radio sensor, causes the locking condition to be satisfied and thus the generation of the unlocking or locking signal. The user is able to comfortably initiate a locking or unlocking of the motor vehicle—in particular, from outside the motor vehicle—merely by pressing a button.

Furthermore, it is conceivable that the radio transmitter be an RFID transponder by means of which the radio signal can be automatically generated, wherein the satisfaction of the locking condition depends upon the detection of the radio signal or the locking condition is satisfied when a distance condition is satisfied, wherein the distance condition is satisfied when key position information indicates that a current distance between the motor vehicle and the key exceeds and/or falls below a distance limit value. RFID stands for "radio-frequency identification" and is a technology well known to the person skilled in the art. Thus, the radio transmitter of the key typically sends a key-specific identification signal as a radio signal, so that an explicit control action on the part of the user is no longer required for the purpose of locking or unlocking the motor vehicle. The emission of this signal is caused, for example, by the radio sensor, which generates a high-frequency electromagnetic alternating field, to which the RFID transponder is exposed when approached appropriately, as a result of which the transmission of the identification signal is triggered. Instead of the key, a mobile telephone—in particular, a smartphone—of the user can also be used in this context.

The locking condition can also be satisfied if a recognition condition is satisfied. This is satisfied, for example, if the user has been recognized by a sensor system of the motor vehicle. For this purpose, a face recognition or the like can take place, for example, in which image data captured by means of a camera of the motor vehicle are automatically evaluated as part of face recognition software, wherein the unlocking signal is generated if the user has been identified. In addition, the locking signal can be generated in the event of a detected absence of the user.

If the user or key enters the detection range of the radio sensor, the presence of the identification signal is detected, as a result of which the locking condition can be satisfied, and therefore the generation of the unlocking signal can be brought about. Similarly, the absence of the identification signal can be detected if the user or key leaves the detection range of the radio sensor, thereby causing the locking condition to be satisfied and the generation of the locking signal.

Alternatively, the distance condition can be satisfied if the distance between the motor vehicle and the key falls below the distance limit value, wherein in this case the unlocking signal is generated. Therefore, the motor vehicle is unlocked when the key and thus the user approaches the motor vehicle and enters a radius, amounting to the distance limit value, around the motor vehicle. Likewise, the distance condition can then be satisfied if the distance between the motor vehicle and the key exceeds the distance limit value, wherein in this case the locking signal is generated. Therefore, the motor vehicle is locked when the key or the user is removed from the motor vehicle and leaves a radius, amounting to the distance limit value, around the motor vehicle. The distance limit value can be between 5 and 50 meters, and preferably 20 meters. The distance limit value is preferably a fixedly predetermined value stored in the control device of the motor vehicle.

Returning to the more general case, the at least one output condition is the get-in or get-out condition. In a preferred embodiment of the motor vehicle according to the present disclosure, the at least one control device is configured in this case to control the at least one illumination device and the at least one acoustic device in such a way that, when the get-out condition indicating a turn-off of the motor vehicle is satisfied, a multi-phase coming-home scenario can be realized, and/or, when the get-in condition indicating a start-up of the motor vehicle is satisfied, a multi-phase leaving-home scenario can be realized, wherein a phase-specific reproduction pattern of the light signal and of the acoustic signal can be generated in each of the phases of the coming-home and/or leaving-home scenario. The coming-home or leaving-home scenario is a display sequence—in particular, at least partially fixedly predefined-relating to the light signal and the acoustic signal. Each of the phases of the coming-home or leaving-home scenario can be provided in this case for outputting information assigned specifically to the respective phase. The corresponding information can be relevant both for the driver and for further road users. Thus, the coming-home scenario relates to the process when the driver has arrived at their destination, e.g., their home, stops the engine, and leaves and locks the motor vehicle. By contrast, the leaving-home scenario relates to the process when the driver wishes to drive off, i.e., approaches the motor vehicle, unlocks it, enters, and starts the engine.

In conjunction with the coming-or leaving-home scenario, it can be provided that the get-in or get-out condition be satisfied when a door condition and/or an ignition lock condition and/or a locking condition and/or the or a distance condition is satisfied. All of these conditions are suitable for indicating a parking of the motor vehicle or a start of the journey, and initiate the coming-home or leaving-home scenario.

If the get-in or get-out condition is the door condition, it can be satisfied when the or a door of the motor vehicle is open or closed. If the get-out condition is the ignition lock condition, it can be satisfied when the key position of the ignition lock is transferred to a switched-off position. If the get-in condition is the ignition lock condition, it can be satisfied when the key position of the ignition lock is transferred to a switched-on position. If the get-out condition is the locking condition, it can be satisfied when the locking signal causing locking of the motor vehicle is present. If the get-in condition is the locking condition, it can be satisfied when the unlocking signal causing an unlocking of the motor vehicle is present. If the get-out condition is the distance condition, it can be satisfied if the distance between the motor vehicle and the key exceeds the distance limit value. If the get-in condition is the distance condition, it can be satisfied if the distance between the motor vehicle and the key falls below the distance limit value.

In conjunction with the coming-home or leaving-home scenario, the control device can be configured to check whether at least one phase transition condition is satisfied and, if the at least one phase transition condition is satisfied, to generate a control command that brings about the transition from one phase to the next phase and/or the termination of the last phase, wherein the phase transition condition is only fulfilled or can only be fulfilled when a door condition and/or an ignition lock condition and/or a locking condition and/or a distance condition is satisfied. Thus, the corresponding conditions can be used not only, as previously described, to initiate the coming-home or leaving-home scenario, but also can be used in conjunction with the transition from one phase to the next phase of the respective scenario. Thus, the specific aspects set out in the last paragraph can equally apply to the phase transition condition with respect to the get-in or get-out condition.

Furthermore, it can be provided in this context that the phase transition condition only be satisfied or satisfiable when a further distance condition is satisfied. The further distance condition is satisfied if the distance between the motor vehicle and the key exceeds and/or falls below a further distance limit. Thus, exceeding the further distance limit value means that the user moves out of or into the immediate vicinity of the motor vehicle. The further distance limit value is less than the distance limit value and can be approximately between one-half and ten meters, and preferably three meters.

In the context of the coming-home and/or leaving-home scenario, it can be provided that the at least one control device of the motor vehicle be configured to check the satisfaction of an abort condition and to abort the coming-home and/or leaving-home scenario when satisfied. The abort condition is satisfied, for example, when an abort signal that can be generated by means of an operating device of the motor vehicle—in particular, by means of the key—is detected. For example, pressing an abort button of the key can cause the emission of the abort signal by means of the radio transmitter, wherein this signal can be detected by means of the radio sensor of the motor vehicle. It is thus made possible for the user to abort the currently reproduced coming- or leaving-home scenario, e.g., if they wish to prevent the output of the acoustic signals due to the time of day.

If the at least one output condition is the maneuver condition, it can be provided that the at least one operating device be an accelerator pedal of the motor vehicle, wherein the maneuver condition is satisfied when the accelerator pedal is actuated. In this embodiment, an imminent acceleration of the motor vehicle is indicated by means of the at least one illumination device and the at least one acoustic device. In order to improve the intuitive detectability of this information, the acoustic signal can be a humming noise increasing with respect to the audio frequency and/or the volume. In addition, it is conceivable that a light intensity of the signal light be coupled to the audio frequency or the volume.

If the at least one output condition is the maneuver condition, it can additionally or alternatively be provided that a reverse gear be able to be engaged by means of the at least one operating device provided in particular as a gearshift and/or a touchscreen and/or an operating button and/or a selector lever, wherein the maneuver condition is satisfied when the reverse gear is engaged. In particular, it is conceivable in this context that the output of the acoustic signal be coupled to the output of the light signal by means of the rear light.

If the at least one output condition is the driving state condition, it can be provided that it be satisfied when a change is made from an at least partially autonomous driving mode to a manual driving mode of the at least partially autonomously operable motor vehicle, and/or vice versa. The corresponding signal output implies a drive mode change to the effect that a transfer of the control of the motor vehicle from the driver assistance system to the driver, or vice versa, takes place. This information can ultimately also be relevant to the driver of the motor vehicle.

If the at least one output condition is the driving state condition, it can additionally or alternatively be provided that it be satisfied when a hazard situation is present, wherein the control device is configured to detect the presence of the hazard situation on the basis of a signal of a sensor of the motor vehicle—in particular, a camera and/or a radar sensor. Thus, if a hazard situation is detected within the scope of the driver assistance system, an information output can take place directly and without a delay. It is particularly advantageous here that an intervention by the driver such as an actuation of the horn is not necessary. In particular, if the interior illumination device of the motor vehicle is included within the scope of the signal output, the warning message is also output in the direction of the driver in the motor vehicle, who might not yet have detected the hazard situation. In this case, the light signal can be a light flash—in particular, switched on and off periodically—and the acoustic signal can be a horn noise or a text-based output signal, such as the spoken word, "attention," or the like.

The object of present disclosure is further achieved by a method for operating a motor vehicle, comprising at least one illumination device, by means of which at least one light signal visible from outside the motor vehicle is generated, and at least one acoustic device, by means of which at least one acoustic signal audible from outside the motor vehicle is generated, wherein the satisfaction of at least one output condition is checked, and, if the at least one output condition is satisfied, the light signal and the acoustic signal are generated simultaneously, wherein the at least one output condition is at least one get-in or get-out condition relating to a current start-up or the turn-off situation of the motor vehicle, the satisfaction of which condition depends upon at least one control signal which is generated by means of a system and/or sensor of the motor vehicle relating to the start-up and/or the turn-off process of the motor vehicle, and/or at least one maneuver condition relating to a current or imminent reversing or acceleration maneuver of the motor vehicle, the satisfaction of which condition depends upon at least one control signal which is generated by means of a driver assistance system of the motor vehicle and/or upon an operating signal which is generated by a user by means of at least one operating device of the motor vehicle, and/or at least one driving state condition relating to a current operating situation of the motor vehicle, the satisfaction of which condition depends upon at least one control signal which is generated by means of a driver assistance system of the motor vehicle.

All the advantages, features, and developments of the motor vehicle according to the present disclosure can be applied to the method according to the present disclosure, and vice versa.

Figure 2:
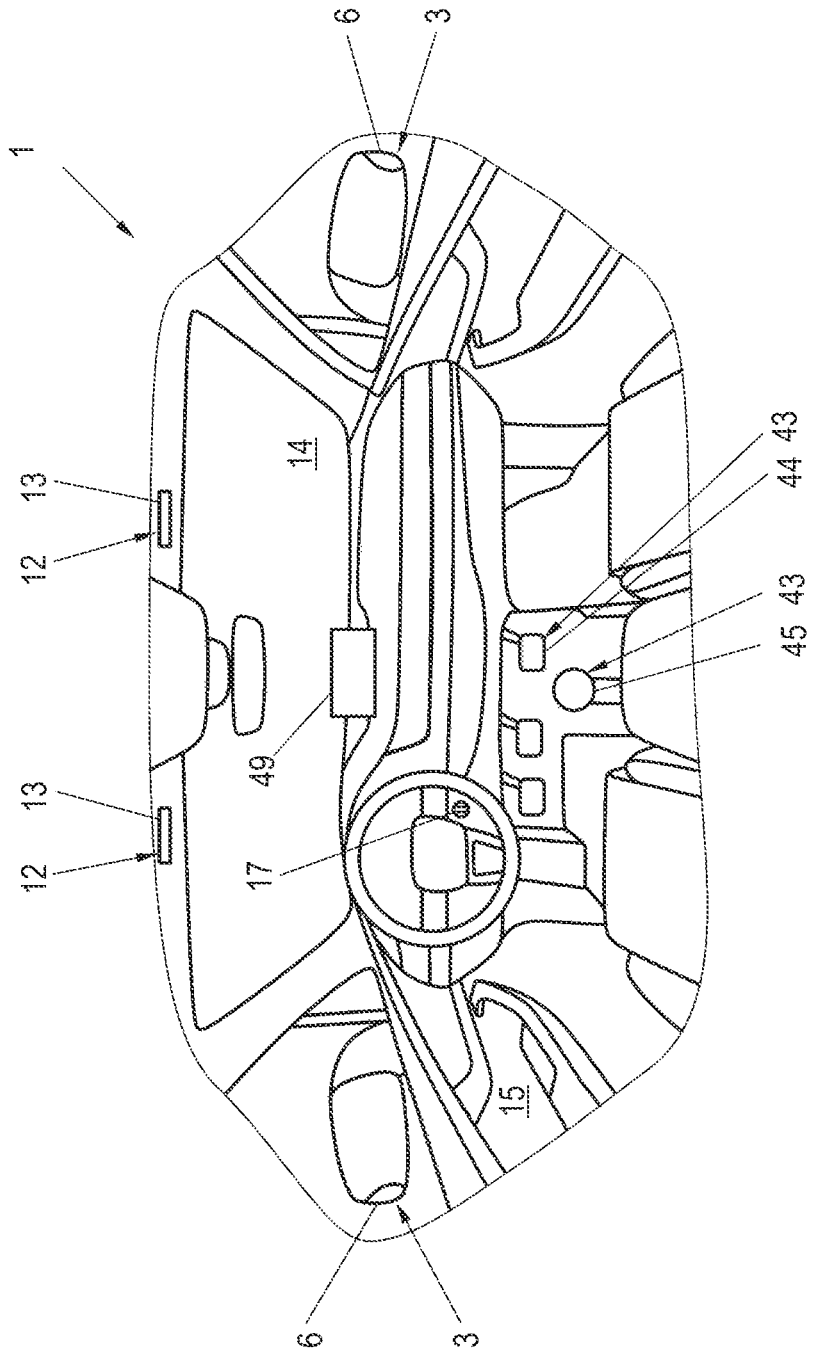
FIG. 2 shows an interior view of the motor vehicle from FIG. 1.

FIG. 1 shows an exemplary embodiment of a motor vehicle 1 according to the present disclosure, wherein further details are shown on the basis of the interior view of this motor vehicle 1 shown in FIG. 2. In addition, exemplary embodiments of the method according to the present disclosure are explained on the basis of the motor vehicle 1.

The motor vehicle 1 comprises several illumination devices 2, by means of which light signals visible from outside the motor vehicle 1 can be generated. The illumination devices 2 comprise light-emitting diodes for this purpose, by means of which light of corresponding colors can be generated. Moreover, the motor vehicle comprises several acoustic devices 3, by means of which acoustic signals audible from outside the motor vehicle 1 can be generated.

Specifically, as illumination device 2, two headlights 4 arranged on the front, and, moreover, left and right sides, of the motor vehicle 1 are provided, by means of which a white light can be generated, viz., a daytime running light, a dipped beam, and a high beam. In addition, an orange flashing light for the directional display can be output by means of the headlights 4. Specifically, the headlights 4 are also designed as projection units, viz., in each case as a Digital Matrix Light ("DML"), by means of which a projection onto a projection surface in the surroundings of the motor vehicle, e.g., onto a road or a wall, can be generated.

Moreover, rear lights 5 arranged on the rear, and, moreover, on the left and right sides, of the motor vehicle 1, are provided as illumination devices 2. A red tail light can be generated by means of the rear lights 5. Likewise, as in the case of the headlights 4, an orange flashing light can also be output by means of the rear lights 5.

Furthermore, as illumination devices 2, two side lights 6 each arranged on the side mirrors of the motor vehicle are provided, by means of which an orange flashing light can be output as part of a flashing function of the motor vehicle 1.

Lastly, two position lights 7 are provided as illumination devices 2 and are arranged adjacently to and below the headlights 4. A white position light of the motor vehicle 1 can be output by means of the position lights 7.

A horn 8, by means of which a horn signal can be output, is provided as the acoustic device 3 of the motor vehicle 1. The basic mode of operation of the horn 8, e.g., based upon the principle of a Wagner hammer or the like, is sufficiently known to the person skilled in the art and is therefore not explained in greater detail.

Furthermore, four loudspeakers 9 are provided as acoustic devices 3. The loudspeakers 9 are arranged by way of example in the front and rear regions of the motor vehicle 1—in each case on the left and right sides. By means of the loudspeakers 9, tones or noises of different sorts can be output in different directions.

The motor vehicle 1 comprises a control device 10, which is configured to control the illumination devices 2 and the acoustic devices 3 when an output condition, explained in greater detail below, is satisfied—in particular, to control them individually in such a way that the light signal and the acoustic signal are generated simultaneously. Specifically, the control device 10 is configured, by way of example, to cyclically pass through an evaluation algorithm for this purpose, in which it is checked whether corresponding output conditions are satisfied as a function of sensor signals and/or by control signals present in the context of the control of the motor vehicle 1, to which reference is made in detail later. The control device 10 is configured, if this is the case, to output corresponding control signals to the illumination devices 2 and the acoustic devices 3. For this purpose, the control device 10 is connected to sensors and the illumination devices 2 and the acoustic devices 3 via electrical signal lines, which in the present case are not shown in the figures for reasons of clarity. The controls which can be carried out by the control device 10 can also be divided into several control devices which communicate with one another, for example, by means of a bus system of the motor vehicle 1 or the like. The control device 10 is also configured to control a driver assistance system 11 of the motor vehicle 1, which is provided as a partially autonomously operable motor vehicle 1.

By way of example, it is provided that the motor vehicle 1 also have several interior illumination devices 12 (see FIG. 2), which are present as two ceiling lights 13 arranged in the region of the vehicle headliner, by means of which an illuminating light illuminating the passenger compartment 14 of the motor vehicle 1 can be generated. The control device 10 is configured, when the output condition is satisfied, to additionally control the interior illumination devices 12 such that the light signal of the illumination devices 2, the acoustic signal of the acoustic devices 3, and the illumination light of the interior illumination device 12 are generated simultaneously.

According to a first aspect of the present disclosure, it is provided with respect to the output condition that this get-in or get-out condition describing a current start-up or turn-off situation of the motor vehicle be dependent upon at least one control and/or sensor signal that can be generated by means of a system and sensor of the motor vehicle 1 relating to the start-up and turn-off of the motor vehicle 1. This system, with respect to which further details will be explained later, can be controlled by the control device 10. The control device 10 is configured to control the illumination devices 2 and the acoustic devices 3 and, if applicable, the interior illumination device 12 when the output condition is satisfied, in such a way that the signals output in this context specifically describe the current situation of the motor vehicle 1—in particular, for further road users.

Specifically, the get-in or get-out condition is sometimes a door condition which relates to whether a door 15 of the motor vehicle 1—in particular, a driver door—is currently open or closed, wherein the light signal and the acoustic signal convey this information. A door state sensor 16 is provided for corresponding sensing. The control device 10 is configured to correspondingly evaluate the binary signal of the door state sensor 16, which indicates whether the door 15 is currently open or closed.

The get-in or get-out condition is also an ignition lock condition, which relates in particular to the key position of an ignition lock 17 of the motor vehicle 1. Corresponding sensor signals upon which the satisfaction of the ignition lock condition depends are detectable by means of an ignition lock sensor 18 of the motor vehicle 1. The ignition lock 17 is in a switched-off position when a key 19 of the motor vehicle 1 is not plugged into the ignition lock 17 or, if the key 19 is plugged into the ignition lock 17, is in a non-operating position. The ignition lock 17 of the motor vehicle 1 is in a switched-on position when the key 19 has been inserted into the ignition lock 17 and has been rotated into an operating position so that an ignition of the motor vehicle 1 has been activated.

Figure 3:
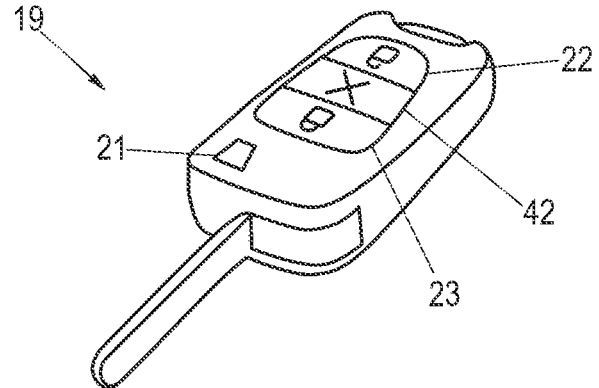
FIG. 3 shows a detailed view of a key of the motor vehicle from FIG. 1.

In addition, the get-in or get-out condition is a locking condition which indicates that a locking or unlocking signal causing a locking or unlocking of the motor vehicle is present, which can be generated by means of a control unit of a locking system of the motor vehicle, wherein the control unit in the present case is the control device 10. This is configured to generate the locking or unlocking signal as a function of a radio signal which can be generated by a user 20 by means of a radio transmitter 21 of the key 19. For this purpose, the key 19, the details of which are shown in FIG. 3, has a locking button 22 and an unlocking button 23, wherein pressing one of the buttons 22, 23 causes the generation of a radio signal. The radio signal can be detected by means of a radio sensor 24 of the motor vehicle 1, wherein the corresponding sensor signals are transmitted to the control device 10. Instead of the key 19, a mobile telephone of the user 20 can also be used in this context.

In a preferred exemplary embodiment, the radio transmitter 21 is an RFID transponder, by means of which the radio signal is an identification signal, so that the user 20 does not have to press a button when approaching or moving away from the motor vehicle to lock it or unlock it, but, rather, the presence of the key 19 or of the user 20 is detected automatically, and the motor vehicle 1 is automatically locked or unlocked. In this context, the control device 10 is configured to determine, on the basis of the radio signal, key position information relating to a current distance between the motor vehicle 1 and the key 19 and/or a current direction of the key 19 with respect to the motor vehicle 1. In order to detect the distance, the radio signal detected by means of a distance sensor—in the present case, the radio sensor 24—is used. The control device 10 is configured to determine the current distance between the motor vehicle 1 and the key 19 or the user 20 on the basis of the signal strength of the radio signal detected by means of the radio sensor 24. This distance is indicated schematically in FIG. 1 by the arrow 25.

Thus, the distance condition is satisfied when the key position information indicates that a current distance between the motor vehicle 1 and the key 19 exceeds and/or falls below a distance limit value. If the radio transmitter 21 is an RFID transponder, the radio transmitter 21 of the key 19 transmits a key-specific identification signal as a radio signal. The transmission of this signal is brought about by the radio sensor 24, which generates a high-frequency electromagnetic alternating field continuously or cyclically, which is detected by means of the radio transmitter 21 when the key 19 accordingly approaches, whereby the transmission of the identification signal is triggered.

The locking condition can also be satisfied if a recognition condition is satisfied. This is satisfied, for example, if the presence of the user 20 in the surroundings of the motor vehicle 1 is detected by means of a face recognition algorithm carried out by the control device 10. For this purpose, image data captured by means of a camera 47 of the motor vehicle 1 can be used, wherein the unlocking signal is generated if the user 20 has been identified. In addition, the locking signal can be generated in the event of a detected absence of the user 20.

The key position information—in particular, the distance between the motor vehicle 1 and the key 19 detected in this context—is used not only in conjunction with the distance condition, but is also specifically included in the output of the light signal and the acoustic signal. For example, if the distance or locking condition is satisfied, the output light signal is a flashing light signal with a certain flashing frequency. Simultaneously with this, the illumination light of the interior illumination device 12 with the same flashing frequency can be switched on and off. The acoustic signal is a beep tone that is periodic and has intervening short pauses, and is output by means of the loudspeakers 9. Here, the flashing frequency of the light signal corresponds to the period of the periodically output beep tone. This frequency is all the greater, the smaller the distance between the motor vehicle 1 and the key 19. In addition, a current frequency of the sound waves of the acoustic signal is all the higher and a current volume of the acoustic signal all the lower, the smaller the distance between the motor vehicle 1 and the key. The key position information is, expediently, updated continuously, so that the light signal and the acoustic signal are continuously adapted thereto. In this case, it is implied to the user 20 that their approach or distance is detected by the motor vehicle 1.

As has already been indicated, the key position information also relates to the direction of the key 19 or user 20 relative to the motor vehicle 1 in addition to the distance between the motor vehicle 1 and the key 19, wherein, also by way of example, the direction is included in the output of the light signal and of the acoustic signal. Thus, the control device is configured to determine the direction of the key 19 as a function of the radio signal detected by the radio sensor 24. For this purpose, it is conceivable for the motor vehicle 1 to have several radio sensors 24, wherein the differences in the signal strengths of the radio signal detected by the radio sensors 24 are used to determine the direction of the key 19. The control signals generated by the control device 10 for controlling the illumination devices 2 and the acoustic devices 3 can now cause the light signal and/or the acoustic signal to be output in a targeted manner in the direction of the user. Thus, for example, only those illumination devices 2 can output a light signal that are visible to the user 20 due to viewing angle of the user to the motor vehicle 1. In addition, for example, only those acoustic devices 3 the output direction of which faces the user 20 can output the acoustic signal.

In summary, in the event that the output condition is the get-in or get-out condition, in each case a signal is output by means of the illumination device 2 and the acoustic device 3, which signal indicates that a start-up or turn-off situation of the motor vehicle 1 is currently present. In particular, the signals specifically imply whether the start-up or turn-off situation relates to an opening or closing of the vehicle door 15, an activation or deactivation of the ignition, or a locking or unlocking of the motor vehicle 1. This information is relevant not only for further road users, but also for the user 20, who is typically located in the surroundings of the motor vehicle 1 in these situations. For example, it is conceivable that the user 20 is not looking in the direction of the motor vehicle 1 at the moment of the motor vehicle 1 being locked or unlocked by the radio signal of the key 20 and therefore does not perceive the light signal, wherein the acoustic signal nevertheless indicates to the user that the locking or unlocking has been successfully carried out.

Figure 4:
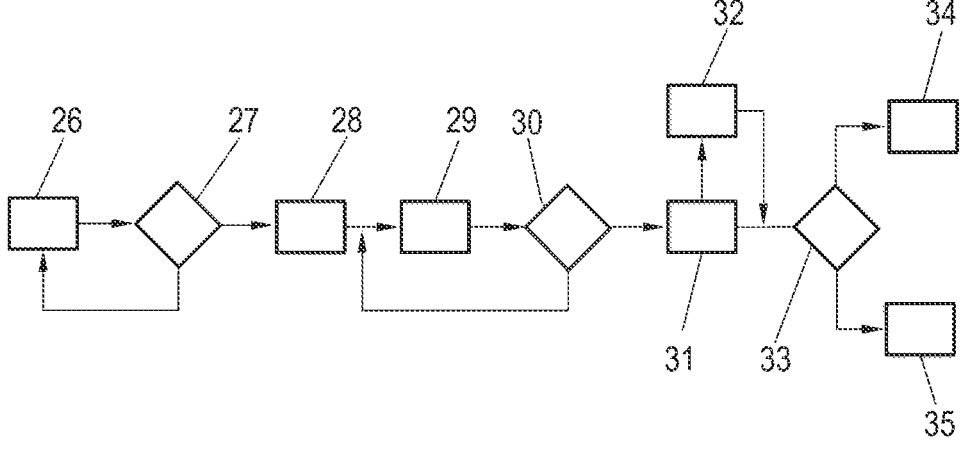
FIG. 4 shows a flowchart of a first exemplary embodiment of the method according to the present disclosure relating to a coming-home scenario.

FIG. 4 relates to a flowchart of a first exemplary embodiment of the method according to the present disclosure, by means of which a so-called coming-home scenario is realized. The coming-home scenario relates to a multi-phase—in particular, fixedly predetermined—generation of light signals and acoustic signals, wherein each phase of the coming-home scenario relates to a typical portion in the context of parking the motor vehicle 1 at a destination. In the following detailed description of the coming-home scenario, just as in the description of a leaving-home scenario described below, it is assumed that the evaluation of the respective signals and the activation of the illumination device 2, the acoustic device 3, and the interior illumination device 12 are carried out by the control device 10, without this being explicitly mentioned in the following every time.

In this context, a situation is presented in which the user 20 has reached the destination of their journey with the motor vehicle 1 and has parked it. The user then rotates the key 19 in order to bring the ignition lock 17 from the switched-on position into the switched-off position. In this case, the method begins in a first step 26, in which a sensor signal of the ignition lock sensor 18 is generated.

In the next step 27 of the method, this sensor signal is evaluated, and it is checked whether the ignition lock condition is satisfied. If this is the case, the method is continued in a next step 28. Otherwise, steps 26 and 27 are run through in a loop until the corresponding sensor signals are generated in step 26, and the method is continued in step 28.

In step 28 of the method, control signals for controlling the illumination device 2, the acoustic device 3, and the interior illumination device 12 are generated such that the light signal and the acoustic signal and the illumination light are generated simultaneously. Specifically, these control signals cause the headlights 4 to generate a dipped beam which is fanned out and pivots downwards when the ignition is switched off. At the same time, the rear lights 5 are switched on briefly. In the meantime, the illumination light of the interior illumination 12 is steadily brightened until maximum brightness of the illumination light is reached. A humming noise is simultaneously generated by means of the loudspeakers 9. The humming noise is generated immediately after the ignition is switched off and steadily decreases in volume until it is completely silent. The user 20, who is still located in the motor vehicle 1 during this first phase of the coming-home scenario, sees the dipped beam that is fanned out and pivoted downwards, as well as the illumination light that is becoming increasingly darker, wherein the user simultaneously perceives the humming noise that is becoming increasingly quiet and implies the switch-off of the ignition. The corresponding signals are also perceived by further road users.

The next step 29 of the method relates to the exiting of the user 20 from the motor vehicle 1. In step 29, a sensor signal of the door state sensor 16 is thus generated regarding the circumstance that the door 15 is initially opened and closed shortly thereafter.

In the next step 30 of the method, these sensor signals are evaluated, and the satisfaction of a phase transition condition, which is specifically the door condition, is checked. If this is the case, the method is continued in a next step 31, and a second phase of the coming-home scenario is initiated. Otherwise, steps 29 and 30 are run through in a loop until the corresponding sensor signals are generated in step 29, and the method is continued in step 31.

In the next step 31 of the method, control signals for controlling the illumination devices 2, the acoustic devices 3, and the interior illumination device 12 are generated in such a way that a so-called "light breathing" takes place in the second phase of the coming-home scenario. Specifically, this means that a cyclical pulsation of the generated light signal takes place, in which this becomes continuously lighter and darker. In the present case, this relates to the daytime running light generated by means of the headlights 4 and the tail light generated by means of the rear lights 5. The side lights 6 and the interior illumination device 12 are included here in this pulsation. In addition, an animated, i.e., dynamic, projection by the headlight 4 is generated, wherein, for example, the word, "bye," is projected onto the ground, and the size and/or color and/or position of this projection are changed. Synchronously to the pulsating light signals, a noise, such as a humming noise, reproduced with respect to its sound frequency and volume, is generated by means of the loudspeakers 9.

Parallel to this phase of "light breathing" in step 31, a radio signal detected by the radio sensor 24 and causing the locking of the motor vehicle 1 is detected by the key 20 within the scope of a step 32, whereupon the locking signal causing the locking of the motor vehicle 1 is generated. It is assumed here that the key 19 is configured in the present case to generate turn-on or turn-off signals by pressing the buttons 22, 23. However, the key 20 can just as well comprise the radio transmitters 21 designed as RFID transponders, wherein, in the context of step 32, the locking signal causing the locking of the motor vehicle 1 is likewise generated as a function of the above-described distance condition. In addition, the pulsation frequency of the light breathing can depend upon the current distance between the motor vehicle 1 and the key 19.

The duration of the phase of the "light breathing," i.e., the performance of step 31 and the step 32 running in parallel for this purpose, is 20 seconds by way of example, wherein, after the lapse of this period, a transition is automatically made to a next step 33 of the method. In step 33, it is checked whether, within the scope of step 32, a locking signal causing the locking of the motor vehicle 1 was generated, or, in other words, whether the locking condition has been satisfied or was satisfied.

If the check in step 33 reveals that a locking of the motor vehicle 1 has been carried out successfully, control signals are generated in the course of a subsequent step 34, which cause the daytime running light of the headlights 4, the position light of the position lights 7, the tail light of the rear lights 5 and the orange flashing light of the headlights 7, the rear lights 5, and the side lights 6 to still light briefly, for a short period of time, such as one second for example, in the course of a third phase of the coming-home scenario. By means of the headlight 4, a symbol of a locked lock is also projected onto the ground in green color. A triangle noise is output by means of the loudspeakers 9, wherein the two last-mentioned outputs signal to the user 20 both optically and acoustically that the motor vehicle 1 has been locked.

If the check in step 33 has revealed that a locking of the motor vehicle 1 has not yet been carried out, control signals are instead generated in the course of a next step 35, which cause the light and acoustic signals just explained in conjunction with step 32 or the third phase of the coming-home scenario to be output equally, but with the difference that, by means of the headlight 4, a symbol of a non-locked lock is projected onto the ground in red color, and that the triangle noise is not output by means of the speakers 9, but instead a short horn noise is output by means of the horn 8. These two outputs signal to the user 20 that the motor vehicle 1 has not yet been locked. The coming-home scenario is concluded with the rise of step 34 or 35.

Figure 5:
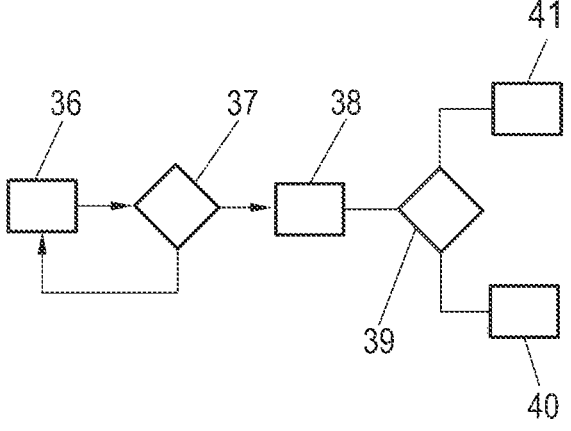
FIG. 5 shows a flowchart of a second exemplary embodiment of the method according to the present disclosure relating to a leaving-home scenario.

FIG. 5 shows a flowchart which relates to a second exemplary embodiment of the method according to the present disclosure for realizing a multi-phase leaving-home scenario. It is assumed here that the key 19 has a radio transmitter 21 designed as an RFID transponder, by means of which the radio signal is emitted as an identification signal.

A first step 36 of this method relates to the circumstance that the user 20 together with the key 19 can be approaching the parked motor vehicle 1. In this case, by means of the radio sensor 24, the identification signal emitted by the key 19 is optionally detected in step 36, and an unlocking of the motor vehicle 1 is generated, provided the key position information determined in this case indicates that the distance between the motor vehicle 1 and the key 19 is smaller than the fixedly predetermined distance limit or, in other words, if the locking condition is satisfied.

In a next step 37, it is checked whether the unlocking condition has been satisfied in the course of step 36, i.e., whether the unlocking signal was generated. If this is the case, the method is continued in a next step 38. Otherwise, steps 36 and 37 are run through in a loop until the satisfaction of the unlocking condition is determined in step 37.

In the step 38, control signals are generated by means of which the headlights 4, the position lights 7, the rear lights 5, and the loudspeakers 9 are controlled. Specifically, these control signals bring about a dipped beam, which is fanned out and pivoted upwards through the headlights 4. At the same time, the rear lights 5 flash briefly. Synchronously for this purpose, a noise that implies the unlocking of the motor vehicle 1, such as a triangle or the like, is generated by means of the loudspeakers 9.

After this first phase, which lasts for example for one second, in the context of a next step 39, a second phase of the leaving-home scenario automatically begins, in which, on the one hand, control signals are sent to the illumination devices 2 and the acoustic devices 3, and, on the other hand, in parallel with this, the satisfaction of a phase transition condition is checked, wherein these two aspects will be explained below.

With regard to the control of the devices 2, 3, the "light breathing" already explained above is carried out in the second phase. In parallel with this, the key position information is continuously updated. The illumination devices 2 and the acoustic devices 3 are controlled in such a way that the pulsation frequency of the light signal and of the acoustic signal and also the current volume of the acoustic signal depend upon the current distance of the key 19. In specific terms, pulsation frequency is all the higher and the volume of the acoustic signal is all the lower, the smaller the current distance between the motor vehicle 1 and the key 19.

With regard to the phase transition condition, it is provided that this be satisfied as soon as a further distance condition is satisfied. This is the case if the distance between the motor vehicle 1 and the key 19 falls below a further distance limit value, which is, for example, three meters, wherein, otherwise, the statements made regarding the detection of the distance for checking the distance condition apply equally to the further distance condition. The satisfaction of the further distance condition implies that the user 20 is about to enter the motor vehicle. If the satisfaction of this phase transition condition is present, step 39 of the method relating to "light breathing" is ended, and, in the course of a further step 41, a third phase of the leaving-home scenario begins. As an alternative to satisfying the further distance condition, the phase transition condition in step 39 can also be satisfied when the door condition is satisfied, i.e., if the sensor signals detected by the door state sensor 16 imply that the door 15 is currently open.

A further aspect relating to a further step 40 is that, after a predetermined period of time has elapsed, which in the present case is 20 seconds by way of example, the method is automatically aborted in step 40, and the motor vehicle 1 is locked again. This would mean that, within this time, the further distance condition was not satisfied, and the user 20 therefore has not moved closer than three meters to the motor vehicle 1, for example. This in turn implies that the user 20 has, in the present case, for example, only accidentally moved past the motor vehicle 1, and does not intend to start a journey, which is why an abortion of the leaving-home scenario is displayed.

Within the scope of step 41 or the third phase, provision is made for control signals to be generated in such a way that a short switch-on of the dipped beam light by means of the headlights 4, a short illumination of the tail light by means of the rear lights 5, and a steady illumination light which becomes brighter up to a maximum brightness are brought about by means of the internal illumination device 12. In addition, a short humming noise is generated by the loudspeakers 9. With regard to the generation of the humming noise, it can also be provided within the scope of step 41 that, if fault information relating to a vehicle system of the motor vehicle 1 is present, a noise be generated instead of the humming, which implies the presence of a malfunction to the user 20. The acoustic signal can take place, for example, in the form of a text output—for example, the word, "error," or the like.

An aspect additionally provided in conjunction with the coming-home and leaving-home scenario relates to the circumstance that the control device 10 of the motor vehicle 1 is configured to check in parallel the satisfaction of an abort condition during each method step 26 through 41, wherein the respective scenario is aborted in the case of a corresponding satisfaction. The abort condition is satisfied if an abort signal which was generated on the basis of the actuation of an abort button 42 of the key 19 is detected by means of the radio sensor 24. It can be expedient to abort, e.g., in situations in which the user 20 wishes to interrupt the complete run-through of the light and acoustic signals output within the scope of these scenarios—for example, since it is currently nighttime, and thus any noise nuisance for local residents is to be avoided.

With regard to a second aspect of the method according to the present disclosure, reference is again made to FIGS. 1 and 2. Thus, within the scope of this aspect, the output condition is a maneuver condition, the satisfaction of which depends upon a current or imminent maneuver. Specifically, the maneuver condition is satisfied when a reversing and acceleration maneuver of the motor vehicle 1 is imminent or is being carried out.

On the one hand, the maneuver condition is satisfied as a function of a control signal which can be generated by means of the driver assistance system 11 of the motor vehicle 1 and which effects a reversing or acceleration maneuver. For instance, in the case that an acceleration or reverse driving is imminent within the scope of the at least semi-autonomous driving operation of the motor vehicle 1, the output of corresponding light and acoustic signals is provided. If, for example, an acceleration of the motor vehicle 1 is imminent, the daytime running light generated by means of the daytime running light headlight 7, for example, can pulsate with respect to its brightness and, synchronously thereto, an acoustic signal which increases in volume or pitch can be output by the loudspeakers 9. In the case of a reversing driving maneuver, a white reversing light can be generated by means of the rear lights 5, for example, wherein a text-based message such as the word, "attention," relating to the reversing maneuver is output by means of the loudspeakers 9.

On the other hand, the maneuver condition is satisfied as a function of an operating signal, which can be generated by the user 20 by means of an operating device 43 of the motor vehicle 1. The operating device 43 is an accelerator pedal 44 of the motor vehicle 1, wherein the maneuver condition is satisfied when the accelerator pedal 44 is actuated. This actuation can be detected, for example, by sensors or on the basis of a control signal present in any case in a drive control of the motor vehicle 1, wherein the corresponding information is transmitted to the control device 10. In addition, a gearshift 45 of the motor vehicle 1 is provided as the operating device 43, wherein the maneuver condition is satisfied when the reverse gear is engaged by means of the gearshift 45. Instead of the gearshift 45, the operating device can be a touchscreen 49, an operating button, a selector lever, or another operating device, by means of which the reverse gear of the motor vehicle 1 can be engaged. To detect the information, a sensor assigned to the operating device 43 or the gearshift 45 can be provided, or a control command provided in any case within the scope of a drive control of the motor vehicle 1 can be used.

With regard to a third aspect of the present disclosure, it is provided that the output condition be a driving state condition describing a current operating situation of the motor vehicle 1. The satisfaction of this condition depends upon a control signal that can be generated by means of the driver assistance system 11. Thus, the driving state information for example indicates a change, which is immediately imminent or currently being executed, from the at least partially autonomous driving mode of the motor vehicle 1 to a manual driving mode. In particular, since the control of the driver assistance system 11, as explained above, is carried out in any case by the control device 10, this information is directly present in the control device 10.

If a corresponding change is immediately imminent or currently being carried out, the control device 10 is configured to generate control signals at the illumination device 2 and the acoustic device 3, in such a way that the text, "Automatic to Manual" or "Manual to Automatic," is projected onto the road in front of the motor vehicle 1 by means of the headlights 4—specifically depending upon whether a change from the autonomous to the manual driving mode occurs, or vice versa. In addition, the position light that can be generated by means of the position lights 7, as well as the tail light generated by means of the rear lights 5, illuminates briefly three times in each case, for example. In addition, an acoustic signal is output by means of the loudspeakers 9, in which, for example, the text, "Automatic to Manual" or "Manual to Automatic," is reproduced.

Furthermore, it is provided that the driving state condition be satisfied when a hazard situation is present, wherein the control device 10 is configured to detect the presence of the hazard situation on the basis of a signal of a sensor, viz., the camera 47 and a radar sensor 48. The detected hazard situation describes, for example, an immediately imminent collision of the motor vehicle 1 with a further road user or an obstacle, such as a lamp post or the like. In this context, the control device 10 performs an evaluation of the signals of the camera 47 and of the radar sensor 48. Thus, the control device 10 is configured such that, in the event of the driving state condition being satisfied, a light flash is output by the headlights 4, and a horn signal is output by the horn 9. In addition, the signal output can take place, e.g., with the involvement of the loudspeakers 9, in the direction of the detected hazard situation.

In general, it should be noted with regard to the acoustic signals that can be reproduced by means of the loudspeakers 9 that they can be fixedly predefined and stored in a memory of the control device 10. However, it is equally conceivable that the acoustic signals, like the light signals, be able to be predetermined by the user 20. In this context, for example, the user 20 can adjust the acoustic signals, e.g., with respect to their pitch and/or volume or the like, as well as the light signals by means of the touchscreen 49, which is connected to the control device 10. In addition, it is conceivable, for example, that acoustic signals be output by means of the loudspeakers 9 within the scope of the method according to the present disclosure, which acoustic signals can be recorded by the user 20, e.g., by means of a smartphone or the like, and be able to be transmitted via a suitable interface to the motor vehicle 1 or the control device 10.

A further, general aspect of the motor vehicle 1 according to the present disclosure relates to the fact that brightness information which relates to the current brightness state in the surroundings of the motor vehicle can be detected by means of a sensor 46, viz., the camera 47. Specifically, it is provided here that the control device 10 be configured to control the brightness of a light signal, which can be generated by means of the illumination devices 2, as a function of the brightness information, e.g., in such a way that the light signal is all the brighter, the brighter the surroundings of the motor vehicle. Furthermore, the at least one control device 10 is configured to control the devices 2, 3 as a function of ambient volume information detected by means of a sensor 46 of the motor vehicle 1, viz., a microphone 50. Thus, the acoustic signal can be all the louder and the light signal all the brighter, the louder it currently is in the surroundings of the motor vehicle.

The invention claimed is:

1. A motor vehicle comprising:
   at least one illumination device configured to generate at least one light signal visible from outside the motor vehicle;
   at least one acoustic device configured to generate at least one acoustic signal audible from outside the motor vehicle;
   at least one interior illumination device inside the motor vehicle; and
   at least one control device configured to:
     check a fulfillment of at least one output condition, the at least one output condition being one of:

a maneuver condition relating to a current or an imminent acceleration maneuver of the motor vehicle, wherein a fulfillment of the maneuver condition is based on generation of at least one operating signal by a user-operated operating device of the motor vehicle, and wherein the user-operated operating device is an accelerator pedal of the motor vehicle, and wherein the maneuver condition is fulfilled when the accelerator pedal is actuated; or
   a driving state condition relating to a current operating situation of the motor vehicle, a fulfillment of the driving state condition being based on at least one control signal generated by a driver assistance system of the motor vehicle, wherein the driving state condition is fulfilled when the motor vehicle changes from a partially autonomous driving mode to a manual driving mode, or vice versa; and
   control the at least one illumination device, the at least one interior illumination device, and the at least one acoustic device to generate the at least one light signal by the at least one illumination device, another light signal by the at least one interior illumination device, and the at least one acoustic signal by the at least one acoustic device simultaneously, in response to at least one of the presence of the maneuver condition or the driving state condition being fulfilled, wherein a first brightness of the at least one light signal, a second brightness of the another light signal, and a noise level of the at least one acoustic signal are based on a second noise level outside the motor vehicle detected using a sound sensor.

2. The motor vehicle of claim 1, wherein the at least one illumination device is configured as at least one of:
   a headlight configured to be at least one of a daytime running light, a dipped beam, a high beam, or a flashing light configured to generate direction indication;
   a rear light configured to generate directional display by a tail light or the flashing light;
   a side light configured to generate a flashing light for directional display; or
   a position light configured to generate a position light of the motor vehicle.

3. The motor vehicle of claim 2, wherein the headlight comprises a projection unit configured to generate a projection surface in a surrounding of the motor vehicle.

4. The motor vehicle of claim 1, wherein the at least one control device is configured to control the at least one illumination device and the at least one acoustic device based on brightness information detectable by a sensor.

5. The motor vehicle of claim 4, wherein the sensor is at least one of a camera or a microphone of the motor vehicle.

6. The motor vehicle of claim 1, wherein the at least one control device is further configured to check another output condition, the another output condition being at least one of:
   a door condition that relates to whether a door of the motor vehicle is currently open or closed, wherein a fulfillment of the door condition is based on a sensor signal generated by a door state sensor of the motor vehicle,
   an ignition lock condition, related to a current change in a key position of an ignition lock of the motor vehicle, wherein a fulfillment of the ignition lock condition is based on a sensor signal generated by an ignition lock sensor of the motor vehicle, or a locking condition, related to a presence of a locking or unlocking signal causing a locking or unlocking of the motor vehicle, wherein the locking or unlocking signal is generated by the at least one control device or a control unit of a locking system of the motor vehicle.

7. The motor vehicle of claim 6, further comprising a key with a radio transmitter configured to generate a radio signal detectable by a radio sensor of the motor vehicle, and wherein the locking or unlocking signal is generated as a function of the radio signal.

8. The motor vehicle of claim 7, wherein the at least one control device or the control unit of the locking system is configured to:
   determine, on the basis of the radio signal, at least one of a key position information relating to at least one of a current distance between the motor vehicle and the key, or a current direction of the key with respect to the motor vehicle,
   wherein the at least one control device is configured to control the at least one illumination device and the at least one acoustic device as a function of the key position information.

9. The motor vehicle of claim 8, wherein the at least one control device is configured to control the at least one illumination device and the at least one acoustic device as a function of the key position information, such that
   at least one of a current flashing frequency of the at least one light signal or a current sound frequency of the at least one acoustic signal is periodically switched on and off, and wherein
   at least one of the current sound frequency or a current volume of the at least one acoustic signal depends upon the distance between the motor vehicle and the key.

10. The motor vehicle of claim 7, wherein the key comprises at least one of:
   another operating device, the another operating device being a locking button or an unlocking button, wherein an actuation of the another operating device causes the generation of the radio signal, wherein the locking condition is fulfilled when the radio signal is detected by the radio sensor, and
   a radio transmitter, the radio transmitter being an RFID transponder configured to automatically generate the radio signal, wherein the fulfillment of the locking condition is based on the detection of the radio signal or the locking condition is fulfilled if a distance condition is fulfilled, wherein the distance condition is fulfilled if the key position information indicates that a current distance between the motor vehicle and the key exceeds or falls below a distance limit value.

11. The motor vehicle of claim 10, wherein the another operating device is a locking button or an unlocking button.

12. The motor vehicle of claim 6, wherein the at least one control device is further configured to check whether a get-in or get-out condition is fulfilled, by checking if at least one of the door condition, the ignition lock condition, the locking condition, or a distance condition is fulfilled.

13. The motor vehicle of claim 6, wherein the at least one control device that is configured to realize a coming-home scenario and/or a leaving-home scenario is further configured to:
   check whether a phase transition condition is fulfilled; and
   in response to the phase transition being fulfilled, generate
      a control command that brings about a transition from one phase to a next phase or a termination of a last phase, wherein the phase transition condition is satisfied when at least one of the door condition, the ignition lock condition, the locking condition, or a distance condition is fulfilled.

14. The motor vehicle of claim 1, wherein the at least one control device is further configured to:
   check another output condition, the another output condition being a maneuver condition that relates to a current or imminent reversing maneuver of the motor vehicle is fulfilled, wherein the fulfillment of the maneuver condition is based on:
   generation of at least one operating signal by the user-operated operating device of the motor vehicle by a user; and
   engagement of a reverse gear by the user-operated operating device.

15. The motor vehicle of claim 14, wherein the user-operated operating device is configured as at least one of a gearshift, a touchscreen, an operating button, or a selector lever.

16. The motor vehicle of claim 1, wherein the at least one control device is further configured to:
   check if the driving state condition is fulfilled when a hazard situation is present; and
   detect the presence of the hazard situation based on a signal of a sensor of the motor vehicle.

17. The motor vehicle of claim 16, wherein the sensor is at least one of a camera or a radar sensor.

18. The motor vehicle of claim 1, further comprising:
   a light sensor configured to detect ambient brightness; and
   the sound sensor configured to detect ambient noise,
   wherein the at least one control device is further configured to:
      increase a brightness level of the at least one light signal in response to detection of high ambient brightness and decrease the brightness level of the at least one light signal in response to detection of low ambient brightness, and
      increase an acoustic signal volume of the acoustic signal in response to detection of high ambient noise and decrease the acoustic signal volume of the acoustic signal in response to detection of low ambient noise.

19. A method for operating a motor vehicle, the method comprising:
   generating, using at least one illumination device, at least one light signal visible from outside the motor vehicle;
   generating, using at least one acoustic device, at least one acoustic signal audible from outside the motor vehicle;
   generating, using at least one interior illumination device inside the motor vehicle, at least one other light signal inside the motor vehicle;
   checking, using at least one control device, if at least one output condition is fulfilled, the at least one output condition being one of:
      a maneuver condition relating to a current or an imminent acceleration maneuver of the motor vehicle, the fulfillment of the maneuver condition being based on generation of at least one operating signal by a user-operated operating device of the motor vehicle, wherein the user-operated operating device is an accelerator pedal of the motor vehicle, and wherein the maneuver condition is fulfilled when the accelerator pedal is actuated, or
      a driving state condition relating to a current operating situation of the motor vehicle, the satisfaction of the driving state condition being based on at least one control signal generated by a driver assistance system of the motor vehicle, wherein the driving state condition is fulfilled when an at least partially autonomously operable motor vehicle changes from a partially autonomous driving mode to a manual driving mode, or vice versa; and controlling the at least one illumination device, the at least one interior illumination device, and the at least one acoustic device to generate the at least one light signal, the at least one other light signal, and the at least one acoustic signal simultaneously, in response to at least one of the maneuver condition, or the driving state condition being satisfied, wherein a first brightness of the at least one light signal, a second brightness of the at least one other light signal, and a noise level of the at least one acoustic signal are based on a second noise level outside the motor vehicle detected using a sound sensor.

20. The method of claim 19, further comprising:

detecting, by a light sensor, ambient brightness;

detecting, by the sound sensor, ambient noise;

increasing a brightness level of the at least one light signal in response to detection of high ambient brightness and decreasing the brightness level of the at least one light signal in response to detection of low ambient brightness; and increasing an acoustic signal volume of the at least one acoustic signal in response to detection of high ambient noise and decreasing the acoustic signal volume of the at least one acoustic signal in response to detection of low ambient noise.

* * * * *